United States Patent
Xiong et al.

(10) Patent No.: US 10,129,151 B2
(45) Date of Patent: Nov. 13, 2018

(54) TRAFFIC MANAGEMENT IMPLEMENTATION METHOD AND APPARATUS, AND NETWORK DEVICE

(71) Applicant: Huawei Technologies Co., Ltd., Shenzhen (CN)

(72) Inventors: Weibo Xiong, Nanjing (CN); Binbin Wu, Nanjing (CN); Minghui Wang, Nanjing (CN); Guichao Huo, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 15/258,439

(22) Filed: Sep. 7, 2016

(65) Prior Publication Data

US 2016/0380895 A1 Dec. 29, 2016

Related U.S. Application Data

(63) Continuation of application No. PCT/CN2015/076090, filed on Apr. 8, 2015.

(30) Foreign Application Priority Data

Sep. 5, 2014 (CN) .......................... 2014 1 0451900

(51) Int. Cl.
*H04L 12/813* (2013.01)
*H04L 12/823* (2013.01)
(Continued)

(52) U.S. Cl.
CPC ............ *H04L 47/115* (2013.01); *H04L 12/24* (2013.01); *H04L 12/26* (2013.01); *H04L 43/062* (2013.01);
(Continued)

(58) Field of Classification Search
None
See application file for complete search history.

(56) References Cited

U.S. PATENT DOCUMENTS 6,892,285 B1 * 5/2005 Key .................. H04L 29/06
370/392
7,035,212 B1 4/2006 Mittal et al.
(Continued)

FOREIGN PATENT DOCUMENTS

| CN | 1946054 A | 4/2007 |
|---|---|---|
| CN | 101505242 A | 8/2009 |
| CN | 101984608 A | 3/2011 |

OTHER PUBLICATIONS

Partial English Translation and Abstract of Chinese Patent Application No. CN101984608, Aug. 1, 2016, 4 pages.
(Continued)

*Primary Examiner* — Duc T Duong
(74) *Attorney, Agent, or Firm* — Conley Rose, P.C.

(57) ABSTRACT

A traffic management (TM) implementation method and apparatus, and a network device, where the TM implementation apparatus is located aside a processor or a switching fabric chip, receives a packet management request sent by the processor or the switching fabric chip, where the packet management request includes a queue identifier, and the queue identifier is used to identify a flow queue in which the processor or the switching fabric chip stores a data packet, performs traffic management on the packet management request, and generates a packet management response according to a management result, where the packet management response includes a management indication and the queue identifier, sends the packet management response to the processor or the switching fabric chip such that the processor or the switching fabric chip processes, according to the management indication, the data packet in the flow queue corresponding to the queue identifier.

17 Claims, 3 Drawing Sheets

(51) Int. Cl.
  *H04L 12/863* (2013.01)
  *H04L 12/801* (2013.01)
  *H04L 12/24* (2006.01)
  *H04L 12/26* (2006.01)
  *H04L 29/06* (2006.01)
(52) U.S. Cl.
  CPC .......... *H04L 47/326* (2013.01); *H04L 47/621* (2013.01); *H04L 69/22* (2013.01)

(56) References Cited

U.S. PATENT DOCUMENTS

| | | | |
|---|---|---|---|
| 2005/0147032 A1* | 7/2005 | Lyon | H04L 47/10 370/229 |
| 2006/0126512 A1* | 6/2006 | Jain | H04L 47/10 370/236 |
| 2007/0163433 A1 | 7/2007 | Chen et al. | |
| 2010/0061238 A1* | 3/2010 | Godbole | H04L 47/11 370/235 |
| 2014/0362867 A1* | 12/2014 | Tanimoto | H04L 47/32 370/412 |
| 2015/0188798 A1* | 7/2015 | Mizrahi | H04L 43/0829 370/252 |
| 2017/0142000 A1* | 5/2017 | Cai | H04L 45/16 |

OTHER PUBLICATIONS

Foreign Communication From a Counterpart Application, PCT Application No. PCT/CN2015/076090, English Translation of International Search Report dated Jul. 9, 2015, 2 pages.
Foreign Communication From a Counterpart Application, European Application No. 15837302.7, Extended European Search Report dated Jan. 23, 2017, 8 pages.

\* cited by examiner

TRAFFIC MANAGEMENT IMPLEMENTATION METHOD AND APPARATUS, AND NETWORK DEVICE

CROSS-REFERENCE TO RELATED APPLICATIONS

This application is a continuation of International Application No. PCT/CN2015/076090, filed on Apr. 8, 2015, which claims priority to Chinese Patent Application No. 201410451900.8, filed on Sep. 5, 2014, both of which are hereby incorporated by reference in their entireties.

TECHNICAL FIELD

The present disclosure relates to the field of network communications, and in particular, to a traffic management (TM) implementation method and apparatus, and a network device.

BACKGROUND

With the development of network and Internet Protocol (IP) technologies, an IP network has changed from a network that provides only a data service to a network that provides several services, such as data, voice, video, and image. Due to features of different services, a device needs to use a quality of service (QoS) technology to provide QoS of different classes for data streams of different service types. Factors for evaluating QoS include a transmission bandwidth, a transmission delay, a packet loss rate, a jitter, and the like. Generally, QoS can be improved from several aspects, for example, ensuring a transmission bandwidth, reducing a transmission delay, reducing a packet loss rate of data, and reducing a jitter. Generally, a device implements, by means of a TM function, performance objectives, such as a transmission bandwidth, a transmission delay, a packet loss rate, and a jitter of a data stream. The TM function may be implemented in a protocol processing chip or a switching fabric chip, or may be implemented using an independent TM chip.

An independent TM chip can meet increasingly more service demands, increasingly large switching capacities and bandwidth demands, and increasingly high QoS requirements. Currently, a TM chip in a device is generally located on a data path between a central processing unit (CPU) and a switching fabric chip, as shown in FIG. 1. An interface of the TM chip needs to be consistent with a high-speed data interface of the data path, which causes that the interface of the TM chip is inflexible and complicated to implement. In addition, the TM chip needs to use a high-specification field programmable gate array (FPGA), such as STRATIX series of ALTERA Corporation and VIRTEX series of XILINX Incorporation in order to meet a requirement of a TM function, logical processing, and performance. Furthermore, in addition to a processor or a switching fabric chip, a dedicated external storage unit, such as a double data rate synchronous dynamic random access memory (DDR SDRAM) or a quad data rate synchronous dynamic random access memory (QDR SDRAM), needs to be equipped to store a data packet and related information. The TM chip also needs to be equipped with a dedicated external storage unit, such as a DDR SDRAM or a QDR SDRAM, to store a data packet and related information, thereby causing a relatively high cost.

SUMMARY

According to a TM implementation method and apparatus, and a network device provided in embodiments of the present disclosure, a TM chip that is dedicatedly used for TM is componentized and is located aside a processor or a switching fabric chip, and interacts and interworks with the processor or the switching fabric chip in order to implement a TM function of the network device, which can reduce implementation difficulty and complexity of hardware TM, and reduce a device cost.

According to a first aspect, a TM implementation method is provided, where the method is executed by a TM implementation apparatus and includes receiving a packet management request sent by a processor or a switching fabric chip, where the packet management request includes a queue identifier, and the queue identifier is used to identify a flow queue in which the processor or the switching fabric chip stores a data packet, performing TM on the packet management request, and generating a packet management response according to a management result, where the packet management response includes a management indication and the queue identifier, and sending the packet management response to the processor or the switching fabric chip such that the processor or the switching fabric chip processes, according to the management indication, the data packet in the flow queue corresponding to the queue identifier.

According to the first aspect, in a first possible implementation manner of the first aspect, performing TM on the packet management request, and generating a packet management response according to a management result includes determining, according to a congestion management policy and a buffer status of a scheduling queue, whether to discard the packet management request, where the scheduling queue is used to store the packet management request, and discarding the packet management request and generating the packet management response if it is determined to discard the packet management request, where the management indication is a discard processing indication such that the processor or the switching fabric chip discards the data packet in the flow queue corresponding to the queue identifier, or storing the packet management request into the scheduling queue if it is determined not to discard the packet management request.

According to the first possible implementation manner of the first aspect, in a second possible implementation manner of the first aspect, performing TM on the packet management request, and generating a packet management response according to a management result includes performing dequeue scheduling on the scheduling queue according to a queue scheduling policy, and generating the packet management response when the packet management request is dequeued from the scheduling queue, where the management indication is a forward processing indication such that the processor or the switching fabric chip forwards the data packet in the flow queue corresponding to the queue identifier.

According to the second possible implementation manner of the first aspect, in a third possible implementation manner of the first aspect, the queue scheduling policy is performing scheduling by byte. The packet management request further includes a packet length, and performing dequeue scheduling on the scheduling queue according to a queue scheduling policy includes performing dequeue scheduling on the scheduling queue according to the queue scheduling policy and the packet length.

According to any one of the first to the third possible implementation manners of the first aspect, in a fourth possible implementation manner of the first aspect, the congestion management policy is congestion tail drop, and determining, according to a congestion management policy and a buffer status of a scheduling queue, whether to discard the packet management request includes determining, according to the congestion management policy, to discard the packet management request if a buffer of the scheduling queue is full, or determining not to discard the packet management request if a buffer of the scheduling queue is not full.

According to any one of the first to the third possible implementation manners of the first aspect, in a fifth possible implementation manner of the first aspect, the congestion management policy is congestion random drop, and determining, according to a congestion management policy and a buffer status of a scheduling queue, whether to discard the packet management request includes acquiring, from the scheduling queue according to the congestion management policy, a packet that is ready to be randomly discarded if a buffer of the scheduling queue is full, and determining to discard the packet management request if the packet that is ready to be randomly discarded includes the packet management request, or determining not to discard the packet management request if the packet that is ready to be randomly discarded does not include the packet management request, or determining not to discard the packet management request if a buffer of the scheduling queue is not full.

According to any one of the first aspect and the first and the second possible implementation manners of the first aspect, the packet management request further includes a packet length, and the packet management response further includes the packet length such that the processor or the switching fabric chip acquires, according to the packet length, the data packet from the flow queue corresponding to the queue identifier.

According to a second aspect, a TM implementation apparatus is provided, including a receiving module configured to receive a packet management request sent by a processor or a switching fabric chip, where the packet management request includes a queue identifier, and the queue identifier is used to identify a flow queue in which the processor or the switching fabric chip stores a data packet, a TM module configured to perform TM on the packet management request, and generate a packet management response according to a management result, where the packet management response includes a management indication and the queue identifier, and a sending module configured to send the packet management response to the processor or the switching fabric chip such that the processor or the switching fabric chip processes, according to the management indication, the data packet in the flow queue corresponding to the queue identifier.

According to the second aspect, in a first possible implementation manner of the second aspect, the TM module is further configured to determine, according to a congestion management policy and a buffer status of a scheduling queue, whether to discard the packet management request, where the scheduling queue is used to store the packet management request, and discard the packet management request and generate the packet management response if it is determined to discard the packet management request, where the management indication is a discard processing indication such that the processor or the switching fabric chip discards the data packet in the flow queue corresponding to the queue identifier, or store the packet management request into the scheduling queue if it is determined not to discard the packet management request.

According to the first possible implementation manner of the second aspect, in a second possible implementation manner of the second aspect, the TM module is further configured to perform dequeue scheduling on the scheduling queue according to a queue scheduling policy, and generate the packet management response when the packet management request is dequeued from the scheduling queue, where the management indication is a forward processing indication such that the processor or the switching fabric chip forwards the data packet in the flow queue corresponding to the queue identifier.

According to the second possible implementation manner of the second aspect, in a third possible implementation manner of the second aspect, the queue scheduling policy is performing scheduling by byte. The packet management request further includes a packet length, and the TM module is further configured to perform dequeue scheduling on the scheduling queue according to the queue scheduling policy and the packet length.

According to any one of the first to the third possible implementation manners of the second aspect, in a fourth possible implementation manner of the second aspect, the congestion management policy is congestion tail drop, and the TM module is further configured to determine, according to the congestion management policy, to discard the packet management request if a buffer of the scheduling queue corresponding to the queue identifier is full, or determine not to discard the packet management request if a buffer of the scheduling queue corresponding to the queue identifier is not full.

According to any one of the first to the third possible implementation manners of the second aspect, in a fifth possible implementation manner of the second aspect, the congestion management policy is congestion random drop, and the TM module is further configured to acquire, according to the congestion management policy, a packet that is ready to be randomly discarded if a buffer of the scheduling queue corresponding to the queue identifier is full, and determine to discard the packet management request if the packet that is ready to be randomly discarded includes the packet management request, or determine not to discard the packet management request if the packet that is ready to be randomly discarded does not include the packet management request, or determine not to discard the packet management request if a buffer of the scheduling queue corresponding to the queue identifier is not full.

According to any one of the second aspect and the first and the second possible implementation manners of the second aspect, in a sixth possible implementation manner of the second aspect, the packet management request further includes a packet length, and the packet management response further includes the packet length such that the processor or the switching fabric chip acquires, according to the packet length, the data packet from the flow queue corresponding to the queue identifier.

According to a third aspect, a network device is provided, including a TM implementation apparatus, a processor, and a switching fabric chip, where the processor includes a first interface and a second interface, where the processor communicates with the TM implementation apparatus through the first interface, and communicates with the switching fabric chip through the second interface. The switching fabric chip is configured to send a data packet to the processor through the second interface. The processor is configured to parse the data packet to acquire a flow identifier, acquire a queue identifier of a corresponding flow queue according to the flow identifier and store the data packet into the flow queue, and send a packet management request to the TM implementation apparatus through the first interface, where the packet management request includes the queue identifier. The TM implementation apparatus is configured to receive the packet management request, perform TM on the packet management request, generate a packet management response according to a management result, where the packet management response includes a management indication and the queue identifier, and send the packet management response to the processor such that the processor processes, according to the management indication, the data packet in the flow queue corresponding to the queue identifier, and the processor is further configured to receive the packet management response through the first interface, and process, according to the management indication, the data packet in the flow queue corresponding to the queue identifier in order to implement TM of the network device.

According to the third aspect, in a first possible implementation manner of the third aspect, the TM implementation apparatus is further configured to determine, according to a congestion management policy and a buffer status of a scheduling queue, whether to discard the packet management request, where the scheduling queue is used to store the packet management request, and discard the packet management request and generate the packet management response if it is determined to discard the packet management request, where the management indication is a discard processing indication such that the processor discards the data packet in the flow queue corresponding to the queue identifier, or store the packet management request into the scheduling queue if it is determined not to discard the packet management request, and the processor is further configured to discard, according to the discard processing indication, the data packet in the flow queue corresponding to the queue identifier.

According to the first possible implementation manner of the third aspect, in a second possible implementation manner of the third aspect, the TM implementation apparatus is further configured to perform dequeue scheduling on the scheduling queue according to a queue scheduling policy, and when the packet management request is dequeued from the scheduling queue, generate the packet management response, where the management indication is a forward processing indication such that the processor forwards the data packet in the flow queue corresponding to the queue identifier, and the processor is further configured to forward, according to the forward processing indication, the data packet in the flow queue corresponding to the queue identifier.

According to the second possible implementation manner of the third aspect, in a third possible implementation manner of the third aspect, the queue scheduling policy is performing scheduling by byte. The packet management request further includes a packet length. The TM implementation apparatus is further configured to perform dequeue scheduling on the scheduling queue according to the queue scheduling policy and the packet length, and the processor is further configured to acquire, according to the packet length, the data packet from the flow queue corresponding to the queue identifier.

According to any one of the first to the third possible implementation manners of the third aspect, in a fourth possible implementation manner of the third aspect, the congestion management policy is congestion tail drop, and the TM implementation apparatus is further configured to determine, according to the congestion management policy, to discard the packet management request if a buffer of the scheduling queue corresponding to the queue identifier is full, or determine not to discard the packet management request if a buffer of the scheduling queue corresponding to the queue identifier is not full.

According to any one of the first to the third possible implementation manners of the third aspect, in a fifth possible implementation manner of the third aspect, the congestion management policy is congestion random drop, and the TM implementation apparatus is further configured to acquire, according to the congestion management policy, a packet that is ready to be randomly discarded if a buffer of the scheduling queue corresponding to the queue identifier is full, and determine to discard the packet management request if the packet that is ready to be randomly discarded includes the packet management request, or determine not to discard the packet management request if the packet that is ready to be randomly discarded does not include the packet management request, or determine not to discard the packet management request if a buffer of the scheduling queue corresponding to the queue identifier is not full.

According to any one of the third aspect and the first and the second possible implementation manners of the third aspect, in a sixth possible implementation manner of the third aspect, the packet management request further includes a packet length, the packet management response further includes the packet length, and the processor is further configured to acquire, according to the packet length, the data packet from the flow queue corresponding to the queue identifier.

According to a fourth aspect, a network device is provided, including a TM implementation apparatus and a switching fabric chip, where the switching fabric chip includes a first interface and communicates with the TM implementation apparatus through the first interface. The switching fabric chip is configured to parse a data packet to acquire a flow identifier, acquire a queue identifier of a corresponding flow queue according to the flow identifier and store the data packet into the flow queue, and send a packet management request to the TM implementation apparatus through the first interface, where the packet management request includes the queue identifier, the TM implementation apparatus is configured to receive the packet management request, perform TM on the packet management request, generate a packet management response according to a management result, where the packet management response includes a management indication and the queue identifier, and send the packet management response to the switching fabric chip such that the switching fabric chip processes, according to the management indication, the data packet in the flow queue corresponding to the queue identifier, and the switching fabric chip is further configured to receive the packet management response through the first interface, and process, according to the management indication, the data packet in the flow queue corresponding to the queue identifier in order to implement TM of the network device.

According to the fourth aspect, in a first possible implementation manner of the fourth aspect, the TM implementation apparatus is further configured to determine, according to a congestion management policy and a buffer status of a scheduling queue, whether to discard the packet management request, where the scheduling queue is used to store the packet management request, and discard the packet management request and generate the packet management response if it is determined to discard the packet management request, where the management indication is a discard processing indication such that the switching fabric chip discards the data packet in the flow queue corresponding to the queue identifier, or store the packet management request into the scheduling queue if it is determined not to discard the packet management request, and the switching fabric chip is further configured to discard, according to the discard processing indication, the data packet in the flow queue corresponding to the queue identifier.

According to the first possible implementation manner of the fourth aspect, in a second possible implementation manner of the fourth aspect, the TM implementation apparatus is further configured to perform dequeue scheduling on the scheduling queue according to a queue scheduling policy, and generate the packet management response, where the management indication is a forward processing indication such that the switching fabric chip forwards the data packet in the flow queue corresponding to the queue identifier when the packet management request is dequeued from the scheduling queue, and the switching fabric chip is further configured to forward, according to the forward processing indication, the data packet in the flow queue corresponding to the queue identifier.

According to the second possible implementation manner of the fourth aspect, in a third possible implementation manner of the fourth aspect, the queue scheduling policy is performing scheduling by byte. The packet management request further includes a packet length. The TM implementation apparatus is further configured to perform dequeue scheduling on the scheduling queue according to the queue scheduling policy and the packet length, and the switching fabric chip is further configured to acquire, according to the packet length, the data packet from the flow queue corresponding to the queue identifier.

According to any one of the first to the third possible implementation manners of the fourth aspect, in a fourth possible implementation manner of the fourth aspect, the congestion management policy is congestion tail drop, and the TM implementation apparatus is further configured to determine, according to the congestion management policy, to discard the packet management request if a buffer of the scheduling queue corresponding to the queue identifier is full, or determine not to discard the packet management request if a buffer of the scheduling queue corresponding to the queue identifier is not full.

According to any one of the first to the third possible implementation manners of the fourth aspect, in a fifth possible implementation manner of the fourth aspect, the congestion management policy is congestion random drop, and the TM implementation apparatus is further configured to acquire, according to the congestion management policy, a packet that is ready to be randomly discarded if a buffer of the scheduling queue corresponding to the queue identifier is full, and determine to discard the packet management request if the packet that is ready to be randomly discarded includes the packet management request, or determine not to discard the packet management request if the packet that is ready to be randomly discarded does not include the packet management request or determine not to discard the packet management request if a buffer of the scheduling queue corresponding to the queue identifier is not full.

According to any one of the fourth aspect and the first and the second possible implementation manners of the fourth aspect, in a sixth possible implementation manner of the fourth aspect, the packet management request further includes a packet length, the packet management response further includes the packet length, and the switching fabric chip is further configured to acquire, according to the packet length, the data packet from the flow queue corresponding to the queue identifier.

According to any one of the fourth aspect and the first to the sixth possible implementation manners of the fourth aspect, in a seventh possible implementation manner of the fourth aspect, the network device further includes a processor, and the switching fabric chip further includes a second interface and communicates with the processor through the second interface.

According to the TM implementation method and apparatus, and the network device provided in the embodiments of the present disclosure, a TM implementation apparatus is componentized and is located aside a processor or a switching fabric chip, and interworks with the processor or the switching fabric chip in order to implement a TM function of the network device. Because parsing and traffic classification are performed on a data packet on the processor or the switching fabric chip, the TM implementation apparatus acquires related information of the data packet by communicating with the processor or the switching fabric chip in order to perform TM. In this way, the TM implementation apparatus does not need to use a high-specification FPGA, and a middle and low level FPGA chip can meet requirements of the TM function, logical processing, and performance, which reduces a cost of the network device. In addition, the TM implementation apparatus does not need to store the data packet, which reduces a quantity of external storage units of the device, and can further reduce the cost of the network device. Furthermore, because a communications interface between the TM implementation apparatus and the processor or the switching fabric chip is not limited by a high-speed data interface of a data path (used for communication between the switching fabric chip and the processor), interface implementation is flexible, which can also reduce implementation complexity and difficulty of the network device.

DESCRIPTION OF EMBODIMENTS

To make the objectives, features, and advantages of the embodiments of present disclosure clearer to understand, the following further describes the embodiments of present disclosure in detail with reference to the accompanying drawings and specific implementation manners.

Being different from that in the prior art, a TM chip is cascaded on a data path between a processor and a switching fabric chip, in the embodiments of the present disclosure, a TM implementation apparatus (hardware TM or TM chip) is located aside a processor or a switching fabric chip, and an interface of the TM implementation apparatus is not necessarily limited to a high-speed data interface of a data path. The TM implementation apparatus does not need to store and process a data packet, but the processor or the switching fabric chip stores the data packet and performs processing, such as parsing and traffic classification, on the data packet.

By communicating with the processor or the switching fabric chip, the TM implementation apparatus acquires related information of the data packet, such as a flow queue identifier, a packet length, and a serial number, and then performs TM functions such as congestion control and queue scheduling according to the related information of the data packet. In this way, the TM implementation apparatus only needs to store the related information of the data packet, and does not need to store the data packet using a dedicated external storage unit, which reduces a quantity of external storage units required by a device, and can reduce a device cost. Then the TM implementation apparatus feeds back a result of executing, according to the related information of the data packet, TM to the processor or the switching fabric chip such that the processor or the switching fabric chip executes a corresponding operation on the data packet according to the result in order to implement TM on the data packet. In this way, the TM implementation apparatus interworks with the processor or the switching fabric chip, which can not only implement a TM function of a network device, but also reduce a device cost. In addition, an interface for communication between the TM implementation apparatus and the processor or the switching fabric chip is decoupled from the high-speed data interface of the data path, which can also reduce implementation complexity of the network device.

Figure 1:
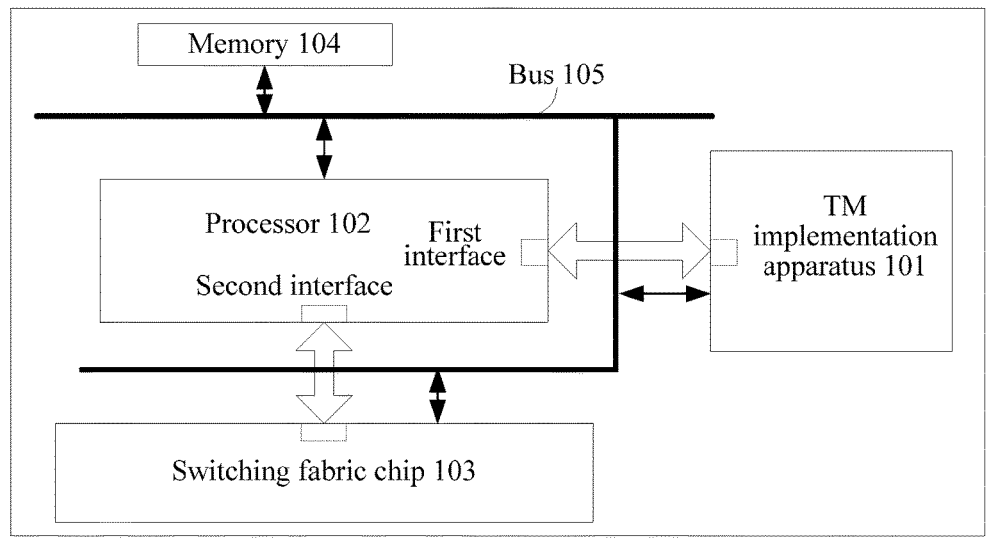
FIG. 1 is a schematic structural diagram of a network device according to an embodiment of the present disclosure.

Referring to FIG. 1, an embodiment of the present disclosure provides a network device, where the network device 10 includes a TM implementation apparatus 101, a processor 102, a switching fabric chip 103, and a memory 104.

The TM implementation apparatus 101, the processor 102, and the switching fabric chip 103 are connected to each other using a bus 105, and the processor 102 may perform operations, such as configuration, control, and management, on the TM implementation apparatus 101 and the switching fabric chip 103 using the bus 105.

The processor 102 accesses the memory 104 using the bus 105.

The bus 105 may be a peripheral component interconnect (PCI) bus, an extended industry standard architecture (EISA) bus, or the like. The bus 105 may be classified into an address bus, a data bus, a control bus, and the like. For ease of denotation, the bus is denoted using only one bold line in FIG. 1. However, it does not indicate that there is only one bus or only one type of bus.

The TM implementation apparatus 101 is located aside the processor 102, and implements a TM function by interacting and interworking with the processor 102.

The processor 102 includes a first interface that is used to communicate with the TM implementation apparatus 101, and further includes a second interface that is used to communicate with the switching fabric chip 103. The second interface is generally a high-speed data interface, such as a 40 gigabit per second (Gbps) interface, and may use any protocol type supported by the processor 102 and the switching fabric chip 103, such as a 10 gigabit media independent interface (XGMII), an XAUI (expansion of the XGMII), or PCI express (PCIe). A rate of the first interface may be lower than a rate of the second interface, for example, the rate of the first interface may be 4 Gbps, 10 Gbps, or the like. A protocol type of the first interface may be the same as a protocol type of the second interface, or may be different from a protocol type of the second interface, which is further determined according to a protocol type supported by the processor 102 and the TM implementation apparatus 101.

Further, the network device 10 further includes several communications ports that are used to communicate with other network devices. After receiving a data packet from a communications port, the network device 10 sends, using the switching fabric chip 103, the received data packet to the processor 102 for processing.

The memory 104 is configured to store a program. Further, the program may include program code, where the program code includes a computer operation instruction. The memory 104 may include a random access memory (RAM), such as a DDR SDRAM, or may include a non-volatile memory, such as a flash memory, a hard disk drive (HDD), or a solid-state drive (SSD).

The switching fabric chip 103 is configured to send the data packet to the processor 102 through the second interface.

The processor 102 executes the program stored in the memory 104 in order to parse the data packet to acquire a flow identifier, acquire a queue identifier of a corresponding flow queue according to the flow identifier and store the data packet into the flow queue, and send a packet management request to the TM implementation apparatus 101 through the first interface, where the packet management request includes the queue identifier.

The memory 104 is further configured to store the flow queue, where the queue identifier is used to identify the flow queue.

The TM implementation apparatus 101 is configured to receive the packet management request, perform TM on the packet management request, generate a packet management response according to a management result, where the packet management response includes a management indication and the queue identifier, and send the packet management response to the processor 102 such that the processor 102 processes, according to the management indication, the data packet in the flow queue corresponding to the queue identifier.

The processor 102 is further configured to receive the packet management response through the first interface, and process, according to the management indication, the data packet in the flow queue corresponding to the queue identifier in order to implement TM of the network device.

The TM implementation apparatus 101 is further configured to determine, according to a congestion management policy of the TM implementation apparatus 101 and a buffer status of a scheduling queue of the TM implementation apparatus 101, whether to discard the packet management request, and discard the packet management request and generate the packet management response if it is determined to discard the packet management request, where the management indication is a discard processing indication such that the processor 102 discards the data packet in the flow queue corresponding to the queue identifier, or store the packet management request into the scheduling queue if it is determined not to discard the packet management request, where the scheduling queue is used to store the packet management request.

The processor 102 is further configured to discard, according to the discard processing indication, the data packet in the flow queue corresponding to the queue identifier.

The TM implementation apparatus 101 is further configured to perform dequeue scheduling on the scheduling queue according to a queue scheduling policy of the TM implementation apparatus 101, and generate the packet management response, where the management indication is a forward processing indication such that the processor 102 forwards the data packet in the flow queue corresponding to the queue identifier when the packet management request is dequeued from the scheduling queue.

The processor 102 is further configured to forward, according to the forward processing indication, the data packet in the flow queue corresponding to the queue identifier.

Because a length of the packet management request is much shorter than a length of the data packet, the TM implementation apparatus 101 needs only one external storage unit, such as a QDR SDRAM, to store the scheduling queue, and the external storage unit does not need to have an extremely large capacity. In addition, because the length of the packet management request is generally fixed, the scheduling queue may be implemented in a manner of a linked list.

The congestion management policy of the TM implementation apparatus 101 includes a policy, such as congestion tail drop or congestion random drop.

When the congestion management policy is the congestion tail drop, that the TM implementation apparatus 101 determines, according to the congestion management policy and the buffer status of the scheduling queue corresponding to the queue identifier, whether to discard the packet management request includes determining, according to the congestion management policy, to discard the packet management request if a buffer of the scheduling queue corresponding to the queue identifier is full, or determining not to discard the packet management request if a buffer of the scheduling queue corresponding to the queue identifier is not full.

When the congestion management policy is the congestion random drop, that the TM implementation apparatus 101 determines, according to the congestion management policy and the buffer status of the scheduling queue corresponding to the queue identifier, whether to discard the packet management request includes acquiring, from the scheduling queue according to the congestion management policy, a packet that is ready to be randomly discarded if a buffer of the scheduling queue corresponding to the queue identifier is full, and determining to discard the packet management request if the packet that is ready to be randomly discarded includes the packet management request, or determining not to discard the packet management request if the packet that is ready to be randomly discarded does not include the packet management request, or determining not to discard the packet management request if a buffer of the scheduling queue corresponding to the queue identifier is not full.

The queue scheduling policy of the TM implementation apparatus 101 may be performing scheduling by byte, or may be performing scheduling by data packet.

When the queue scheduling policy of the TM implementation apparatus 101 is performing scheduling by data packet, the TM implementation apparatus 101 does not need to perform queue scheduling according to a packet length, and whether a packet length of a data packet needs to be exchanged between the TM implementation apparatus 101 and the processor 102 is determined according to an implementation manner of the processor 102.

Three possible implementation manners of the processor 102 are as follows.

In one possible implementation manner, after storing the data packet into the flow queue corresponding to the queue identifier, the processor 102 saves a head pointer and a tail pointer of the data packet in the flow queue such that the data packet can be correctly acquired from the flow queue according to the head pointer and the tail pointer.

When the queue scheduling policy of the TM implementation apparatus 101 is performing scheduling by byte, the packet management request further includes a packet length. The processor 102 is further configured to acquire the packet length of the data packet, and performing dequeue scheduling on the scheduling queue according to the queue scheduling policy includes performing dequeue scheduling on the scheduling queue according to the queue scheduling policy and the packet length.

In another possible implementation manner, after storing the data packet into the flow queue corresponding to the queue identifier, the processor 102 saves a head pointer of the data packet in the flow queue and a packet length of the data packet in order to determine the data packet in the flow queue such that the data packet can be correctly acquired from the flow queue according to the head pointer and the packet length, and the processor 102 is further configured to acquire the packet length of the data packet.

When the queue scheduling policy of the TM implementation apparatus 101 is performing scheduling by byte, the packet management request further includes the packet length, and performing dequeue scheduling on the scheduling queue according to the queue scheduling policy includes performing dequeue scheduling on the scheduling queue according to the queue scheduling policy and the packet length.

In still another possible implementation manner, after storing the data packet into the flow queue corresponding to the queue identifier, the processor 102 saves only a head pointer of the data packet in the flow queue, and the processor 102 further acquires a packet length of the data packet, and exchanges the packet length of the data packet with the TM implementation apparatus 101. The packet management request further includes the packet length, and the packet management response further includes the packet length such that the processor 102 acquires, according to the packet length, the data packet from the flow queue corresponding to the queue identifier, and the processor 102 is further configured to correctly acquire, according to the packet length and the saved head pointer, the data packet from the flow queue corresponding to the queue identifier, and process the data packet according to the management indication.

The foregoing processor 102 in this embodiment of the present disclosure may be a general purpose processor that includes a CPU, a network processor (NP), and the like, or may be a digital signal processor (DSP), an application-specific integrated circuit (ASIC), an FPGA, or another programmable logic device.

The foregoing TM implementation apparatus 101 may be an FPGA or another programmable logic device.

Further, the data packet received by the processor 102 through the second interface may be a fragmented packet. That is, one data packet is divided into several fragmented packets.

The processor 102 may be further configured to reassemble several fragmented packets into one complete data packet. Then as described above, perform parsing and traffic classification on the data packet, that is, acquire a flow identifier, acquire a queue identifier of a corresponding flow queue according to the flow identifier, and store the data packet into the flow queue.

Alternatively, the processor 102 sends a fragment management request corresponding to the fragmented packet to the TM implementation apparatus 101, where the fragment management request includes fragment information and the foregoing queue identifier, and optionally, further includes a packet length of the fragmented packet. The TM implementation apparatus 101 further includes a fragment linked list that is used to store several fragment management requests corresponding to one data packet, and the TM implementation apparatus 101 uses the fragment linked list that stores the several fragment management requests corresponding to the one data packet as a whole to perform the foregoing TM, that is, to perform congestion control, store the data packet into a scheduling queue, and dequeue the data packet from the scheduling queue, and the like.

A packet management request/response transmitted between the TM implementation apparatus 101 and the processor 102 may also encounter a packet loss. Therefore, the packet management request may further include a first serial number, and the packet management response may further include a second serial number in order to identify whether the packet management request/response transmitted between the TM implementation apparatus 101 and the processor 102 encounters a packet loss.

Furthermore, the processor 102 generates a packet management request in ascending or descending order of serial numbers, and buffers the packet management request within a first preset retransmission time, and after receiving the packet management request, the TM implementation apparatus 101 checks whether a serial number of the packet management request increases progressively or decreases progressively compared with a serial number of a previously received packet management request, for example, increases progressively by 1 or decreases progressively by 1. If the serial number of the packet management request increases progressively or decreases progressively compared with the serial number of the previously received packet management request, it is determined that no packet loss occurs. If the serial number of the packet management request does not increase progressively or decrease progressively compared with the serial number of the previously received packet management request, it is determined that a packet loss occurs, and the TM implementation apparatus 101 requests the processor 102 to retransmit a packet management request whose serial number is between the serial number of the packet management request and the serial number of the previously received packet management request.

The TM implementation apparatus 101 is further configured to send a first packet retransmission request, where the first packet retransmission request includes the first serial number. The processor 102 is further configured to receive the first packet retransmission request and retransmit the packet management request corresponding to the first serial number.

Likewise, the TM implementation apparatus 101 generates a packet management response in ascending or descending order of serial numbers, and buffers the packet management response within a second preset retransmission time, and after receiving the packet management response, the processor 102 checks whether a serial number of the packet management response increases progressively or decreases progressively compared with a serial number of a previously received packet management response, for example, increases progressively by 1 or decreases progressively by 1. If the serial number of the packet management response increases progressively or decreases progressively compared with the serial number of the previously received packet management response, it is determined that no packet loss occurs. If the serial number of the packet management response does not increase progressively or decrease progressively compared with the serial number of the previously received packet management response, it is determined that a packet loss occurs, and the processor 102 requests the TM implementation apparatus 101 to retransmit a packet management response whose serial number is between the serial number of the packet management response and the serial number of the previously received packet management response.

The processor 102 is further configured to send a second packet retransmission request, where the second packet retransmission request includes the second serial number. The TM implementation apparatus 101 is further configured to receive the second packet retransmission request and retransmit the packet management response corresponding to the second serial number.

The switching fabric chip 103 may further perform reverse flow control, that is, the switching fabric chip 103 reversely controls, according to a status of flow switching and forwarding performed by the switching fabric chip 103, forwarding of a flow queue by the processor 102. The switching fabric chip 103 is further configured to send a reverse flow control packet to the processor 102, where the reverse flow control packet includes a traffic control requirement and a queue identifier or information about a communications port (such as a port number). The processor 102 is further configured to parse and process the reverse flow control packet, and send a flow control request to the TM implementation apparatus 101, where the flow control request includes the queue identifier and the traffic control requirement such that the TM implementation apparatus 101 can perform, according to the traffic control requirement, enqueue and dequeue scheduling on a scheduling queue corresponding to the queue identifier.

According to the network device provided in this embodiment of the present disclosure, a TM implementation apparatus 101 is located aside a processor 102, and interacts and interworks with the processor 102 in order to implement a TM function of the network device. The TM implementation apparatus 101 does not need to use a high-specification FPGA, and a middle and low level FPGA chip can meet requirements of the TM function, logical processing, and performance, which reduces a cost of the network device. In addition, being different from a TM chip, in the prior art, that needs to be equipped with a dedicated external storage unit to store a data packet, the TM implementation apparatus 101 in this embodiment of the present disclosure does not need to buffer a data packet, which reduces a quantity of external storage units of the device, and can further reduce the cost of the network device. Furthermore, because a communications interface (that is, a first interface) between the TM implementation apparatus 101 and the processor 102 is not limited by a high-speed data interface (that is, a second interface) of a data path (used for communication between a switching fabric chip and the processor), interface implementation is flexible, which can also reduce implementation complexity and difficulty of the network device.

Figure 2A:
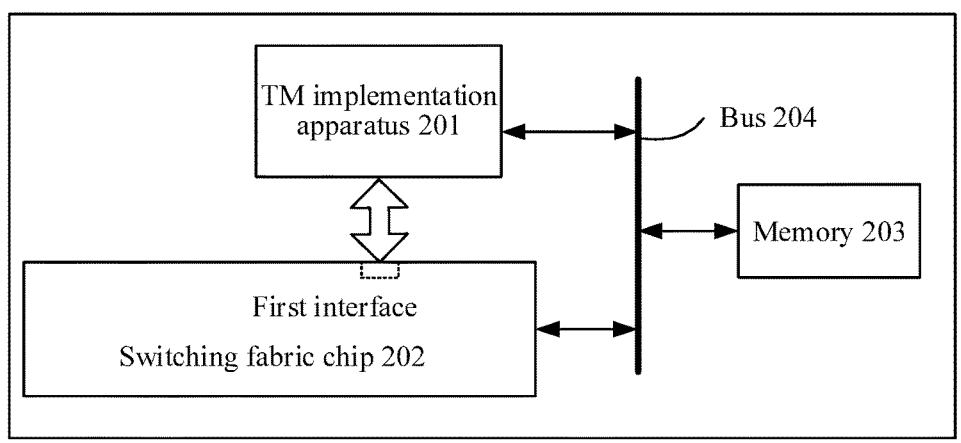
FIG. 2A and FIG. 2B are schematic structural diagrams of another network device according to an embodiment of the present disclosure.

Referring to FIG. 2A, an embodiment of the present disclosure provides another network device, where the network device 20 includes a TM implementation apparatus 201, a switching fabric chip 202, and a memory 203.

The TM implementation apparatus 201 is connected to the switching fabric chip 202 using a bus 204.

The bus 204 may be a PCI bus, an EISA bus, or the like. The bus 204 may be classified into an address bus, a data bus, a control bus, and the like. For ease of denotation, the bus is denoted using only one bold line in FIG. 2A. However, it does not indicate that there is only one bus or only one type of bus.

The switching fabric chip 202 accesses the memory 203 using the bus 204.

The TM implementation apparatus 201 is located aside the switching fabric chip 202, and implements a TM function by interacting and interworking with the switching fabric chip 202.

The switching fabric chip 202 includes a first interface that is used to communicate with the TM implementation apparatus 201, a rate of the first interface does not need to be extremely high, and the rate of the first interface may be 4 Gbps, 10 Gbps, or the like. The first interface may use any protocol type supported by the TM implementation apparatus 201 and the switching fabric chip 202, such as an XAUI or PCIe.

The network device 20 further includes several communications ports that are used to communicate with other network devices. After receiving a data packet from a communications port, the network device 20 sends the received data packet to the switching fabric chip 202.

The switching fabric chip 202 is configured to parse the data packet to acquire a flow identifier, acquire a queue identifier of a flow queue according to the flow identifier and store the data packet into the flow queue corresponding to the queue identifier, and send a packet management request to the TM implementation apparatus 201 through the first interface, where the packet management request includes the queue identifier.

The memory 203 is configured to store the flow queue, where the queue identifier is used to identify the flow queue.

The memory 203 may include a RAM, or may include a non-volatile memory, for example, at least one disk memory.

The TM implementation apparatus 201 is configured to receive the packet management request, perform TM on the packet management request, generate a packet management response according to a management result, where the packet management response includes a management indication and the queue identifier, and send the packet management response to the switching fabric chip 202 such that the switching fabric chip 202 processes, according to the management indication, the data packet in the flow queue corresponding to the queue identifier.

The switching fabric chip 202 is further configured to receive the packet management response through the first interface, and process, according to the management indication, the data packet in the flow queue corresponding to the queue identifier.

The TM implementation apparatus 201 is further configured to determine, according to a congestion management policy of the TM implementation apparatus 201 and a buffer status of a scheduling queue of the TM implementation apparatus 201, whether to discard the packet management request, and discard the packet management request and generate the packet management response if it is determined to discard the packet management request, where the management indication is a discard processing indication such that the switching fabric chip 202 discards the data packet in the flow queue corresponding to the queue identifier, or store the packet management request into the scheduling queue if it is determined not to discard the packet management request, where the scheduling queue is used to store the packet management request.

The switching fabric chip 202 is further configured to discard, according to the discard processing indication, the data packet in the flow queue corresponding to the queue identifier.

The TM implementation apparatus 201 is further configured to perform dequeue scheduling on the scheduling queue according to a queue scheduling policy of the TM implementation apparatus 201, and generate the packet management response when the packet management request is dequeued from the scheduling queue, where the management indication is a forward processing indication such that the switching fabric chip 202 forwards the data packet in the flow queue corresponding to the queue identifier.

The switching fabric chip 202 is further configured to forward, according to the forward processing indication, the data packet in the flow queue corresponding to the queue identifier.

Because a length of the packet management request is much shorter than a length of the data packet, the TM implementation apparatus 201 needs only one external storage unit, such as a QDR SDRAM, to store the scheduling queue, and the external storage unit does not need to have an extremely large capacity. In addition, because the length of the packet management request is generally fixed, the scheduling queue may be implemented in a manner of a linked list.

The congestion management policy of the TM implementation apparatus 201 includes a policy, such as congestion tail drop or congestion random drop.

When the congestion management policy is the congestion tail drop, that the TM implementation apparatus 201 determines, according to the congestion management policy and the buffer status of the scheduling queue corresponding to the queue identifier, whether to discard the packet management request includes determining, according to the congestion management policy, to discard the packet management request if a buffer of the scheduling queue corresponding to the queue identifier is full, or determining not to discard the packet management request if a buffer of the scheduling queue corresponding to the queue identifier is not full.

When the congestion management policy is the congestion random drop, that the TM implementation apparatus 201 determines, according to the congestion management policy and the buffer status of the scheduling queue corresponding to the queue identifier, whether to discard the packet management request includes acquiring, from the scheduling queue according to the congestion management policy, a packet that is ready to be randomly discarded if a buffer of the scheduling queue corresponding to the queue identifier is full, and determining to discard the packet management request if the packet that is ready to be randomly discarded includes the packet management request, or determining not to discard the packet management request if the packet that is ready to be randomly discarded does not include the packet management request, or determining not to discard the packet management request if a buffer of the scheduling queue corresponding to the queue identifier is not full.

Figure 2B:
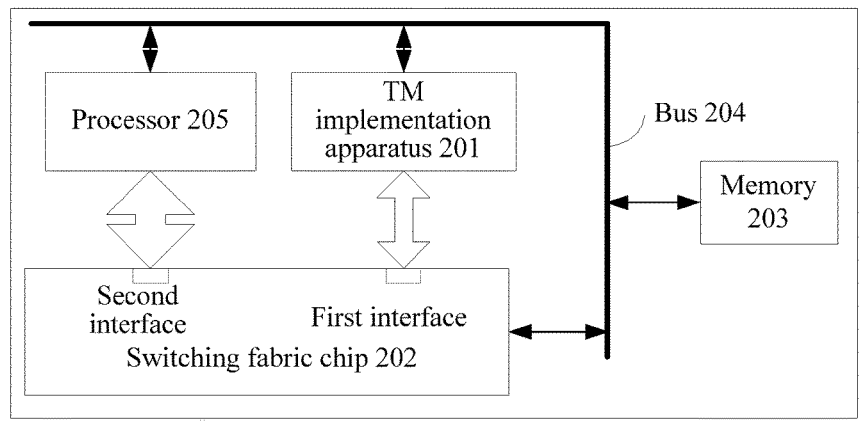

As shown in FIG. 2B, the network device 20 further includes a processor 205. The processor 205 is connected to the TM implementation apparatus 201 and the switching fabric chip 202 using the bus 204.

The processor 205 may perform operations, such as configuration, control, and management, on the TM implementation apparatus 201 and the switching fabric chip 202 using the bus 204.

The processor 205 may be a general purpose processor that includes a CPU, an NP, and the like, or may be a DSP, an ASIC, an FPGA, or another programmable logic device.

The switching fabric chip 202 may further include a second interface that is used to communicate with the processor 205. The second interface is generally a high-speed data interface, such as a 40 Gbps interface, and a rate of the second interface is generally higher than a rate of the first interface. The second interface may use any protocol type supported by the processor 205 and the switching fabric chip 202, such as an XAUI and PCIe. A protocol type of the second interface may be the same as a protocol type of the first interface, or may be different from a protocol type of the first interface, which is further determined according to a protocol type supported by the processor 205 and the TM implementation apparatus 201.

The switching fabric chip 202 is further configured to send the data packet to the processor 205 through the second interface.

The network device 20 may further include a second memory (not shown) that is configured to store a program. Furthermore, the program may include program code, where the program code includes a computer operation instruction. The second memory may include a RAM, such as a DDR SDRAM, or may include a non-volatile memory, such as a flash memory, an HDD, or an SSD.

The processor 205 accesses the second memory using the bus 204. The processor 205 executes the program stored in the second memory in order to perform operations, such as configuration, control, and management, on the TM implementation apparatus 201 and the switching fabric chip 202, and to communicate with the switching fabric chip 202 and receive the data packet sent by the switching fabric chip 202.

The queue scheduling policy of the TM implementation apparatus 201 may be performing scheduling by byte, or may be performing scheduling by data packet.

Furthermore, whether a packet length of a data packet needs to be exchanged between the TM implementation apparatus 201 and the switching fabric chip 202 needs to be determined according to the queue scheduling policy of the TM implementation apparatus 201 and processing performed when the switching fabric chip 202 performs traffic classification on the data packet.

When the queue scheduling policy of the TM implementation apparatus 201 is performing scheduling by data packet, the TM implementation apparatus 201 does not need to perform queue scheduling according to a packet length, and whether a packet length of a data packet needs to be exchanged between the TM implementation apparatus 201 and the switching fabric chip 202 is determined according to an implementation manner of the switching fabric chip 202.

Three possible implementation manners of the switching fabric chip 202 are as follows.

In one possible implementation manner, after storing the data packet into the flow queue corresponding to the queue identifier, the switching fabric chip 202 may save a head pointer and a tail pointer of the data packet in the flow queue such that the data packet can be correctly acquired from the flow queue according to the head pointer and the tail pointer.

When the queue scheduling policy of the TM implementation apparatus 201 is performing scheduling by byte, the packet management request further includes a packet length. The switching fabric chip 202 is further configured to acquire the packet length of the data packet, and performing dequeue scheduling on the scheduling queue according to the queue scheduling policy includes performing dequeue scheduling on the scheduling queue according to the queue scheduling policy and the packet length.

In another possible implementation manner, after storing the data packet into the flow queue corresponding to the queue identifier, the switching fabric chip 202 may save a head pointer of the data packet in the flow queue and a packet length of the data packet in order to determine the data packet in the flow queue such that the data packet can be correctly acquired from the flow queue according to the head pointer and the packet length, and the switching fabric chip 202 is further configured to acquire the packet length of the data packet.

When the queue scheduling policy of the TM implementation apparatus 201 is performing scheduling by byte, the packet management request further includes the packet length, and performing dequeue scheduling on the scheduling queue according to the queue scheduling policy includes performing dequeue scheduling on the scheduling queue according to the queue scheduling policy and the packet length.

In still another possible implementation manner, after storing the data packet into the flow queue corresponding to the queue identifier, the switching fabric chip 202 may save a head pointer of the data packet in the flow queue, and the switching fabric chip 202 further acquires a packet length of the data packet and exchanges the packet length of the data packet with the TM implementation apparatus 201. The packet management request further includes the packet length, and the packet management response further includes the packet length such that the switching fabric chip 202 can correctly acquire, according to the packet length, the data packet from the flow queue corresponding to the queue identifier, and the switching fabric chip 202 is further configured to correctly acquire, according to the packet length and the saved head pointer, the data packet from the flow queue corresponding to the queue identifier, and process the data packet according to the management indication.

The foregoing TM implementation apparatus 201 may be an FPGA or another programmable logic device.

Further, the data packet received by the switching fabric chip 202 may be a fragmented packet. That is, one data packet is divided into several fragmented packets.

The switching fabric chip 202 may be further configured to reassemble several fragmented packets into one complete data packet. Then as described above, perform parsing and traffic classification on the data packet, that is, acquire a flow identifier, acquire a queue identifier of a corresponding flow queue according to the flow identifier, and store the data packet into the flow queue.

Alternatively, the switching fabric chip 202 sends a fragment management request corresponding to the fragmented packet to the TM implementation apparatus 201, where the fragment management request includes fragment information and the foregoing queue identifier, and optionally, further includes a packet length of the fragmented packet. The TM implementation apparatus 201 further includes a fragment linked list that is used to store several fragment management requests corresponding to one data packet, and the TM implementation apparatus 201 uses the fragment linked list that stores the several fragment management requests corresponding to the one data packet as a whole to perform the foregoing TM, that is, to perform congestion control, store the data packet into a scheduling queue, and dequeue the data packet from the scheduling queue, and the like.

A packet management request/response transmitted between the TM implementation apparatus 201 and the switching fabric chip 202 may also encounter a packet loss. Therefore, the packet management request may further include a first serial number, and the packet management response may further include a second serial number in order to identify whether the packet management request/ response transmitted between the TM implementation apparatus 201 and the switching fabric chip 202 encounters a packet loss.

Furthermore, the switching fabric chip 202 generates a packet management request in ascending or descending order of serial numbers, and buffers the packet management request within a first preset retransmission time, and after receiving the packet management request, the TM implementation apparatus 201 checks whether a serial number of the packet management request increases progressively or decreases progressively compared with a serial number of a previously received packet management request, for example, increases progressively by 1 or decreases progressively by 1. If the serial number of the packet management request increases progressively or decreases progressively compared with the serial number of the previously received packet management request, it is determined that no packet loss occurs. If the serial number of the packet management request does not increase progressively or decrease progressively compared with the serial number of the previously received packet management request, it is determined that a packet loss occurs, and the TM implementation apparatus 201 requests the switching fabric chip 202 to retransmit a packet management request whose serial number is between the serial number of the packet management request and the serial number of the previously received packet management request.

The TM implementation apparatus 201 is further configured to send a first packet retransmission request, where the first packet retransmission request includes the first serial number. The switching fabric chip 202 is further configured to receive the first packet retransmission request and retransmit the packet management request corresponding to the first serial number.

Likewise, the TM implementation apparatus 201 generates a packet management response in ascending or descending order of serial numbers, and buffers the packet management response within a second preset retransmission time, and after receiving the packet management response, the switching fabric chip 202 checks whether a serial number of the packet management response increases progressively or decreases progressively compared with a serial number of a previously received packet management response, for example, increases progressively by 1 or decreases progressively by 1. If the serial number of the packet management response increases progressively or decreases progressively compared with the serial number of the previously received packet management response, it is determined that no packet loss occurs. If the serial number of the packet management response does not increase progressively or decrease progressively compared with the serial number of the previously received packet management response, it is determined that a packet loss occurs, and the switching fabric chip 202 requests the TM implementation apparatus 201 to retransmit a packet management response whose serial number is between the serial number of the packet management response and the serial number of the previously received packet management response.

The switching fabric chip 202 is further configured to send a second packet retransmission request, where the second packet retransmission request includes the second serial number. The TM implementation apparatus 201 is further configured to receive the second packet retransmission request and retransmit the packet management response corresponding to the second serial number.

Further, the switching fabric chip 202 may further perform reverse flow control, that is, reversely control forwarding of a flow queue. The switching fabric chip 202 is further configured to send a flow control request to the TM implementation apparatus 201, where the flow control request includes a queue identifier and a traffic control requirement such that the TM implementation apparatus 201 can perform, according to the traffic control requirement, enqueue and dequeue scheduling on a scheduling queue corresponding to the queue identifier.

According to the network device provided in this embodiment of the present disclosure, a TM implementation apparatus 201 is located aside a switching fabric chip 202, and interacts and interworks with the switching fabric chip 202 in order to implement a TM function of the network device. The TM implementation apparatus 201 does not need to use a high-specification FPGA, and a middle and low level FPGA chip can meet requirements of the TM function, logical processing, and performance, which reduces a cost of the network device. In addition, being different from a TM chip, in the prior art, that needs to be equipped with a dedicated external storage unit to store a data packet, the TM implementation apparatus 201 in this embodiment of the present disclosure does not need to store a data packet, which reduces a quantity of external storage units of the device, and can further reduce the cost of the network device. Furthermore, because a communications interface (that is, a first interface) between the TM implementation apparatus 201 and the switching fabric chip 202 is not limited by a high-speed data interface (that is, a second interface) of a data path (used for communication between the switching fabric chip 202 and the processor 205), interface implementation is flexible, which can also reduce implementation complexity and difficulty of the network device.

Figure 3:
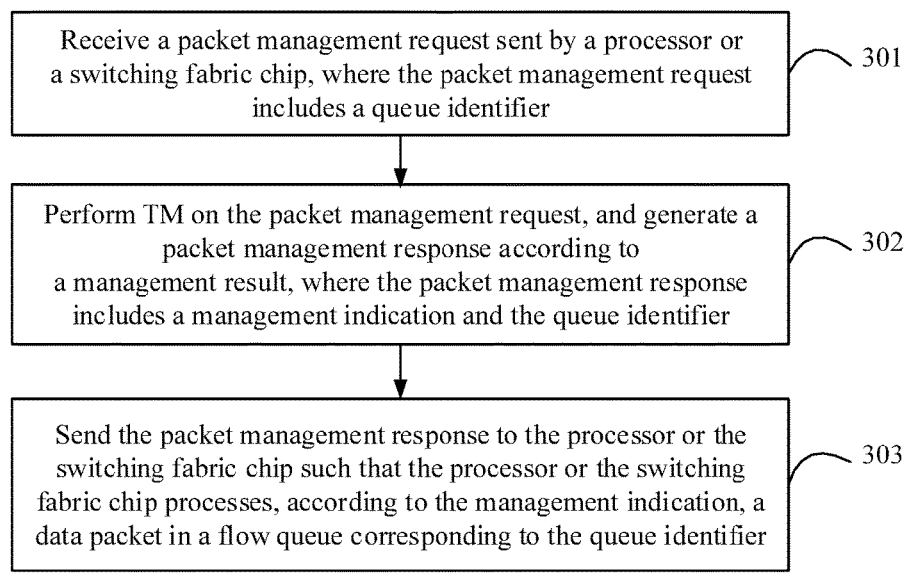
FIG. 3 is a flowchart of a TM implementation method according to an embodiment of the present disclosure.

Referring to FIG. 3, an embodiment of the present disclosure provides a TM implementation method, which is executed by the foregoing TM implementation apparatus. As shown in FIG. 3, the method includes the following steps.

Step 301: Receive a packet management request sent by a processor or a switching fabric chip, where the packet management request includes a queue identifier.

Step 302: Perform TM on the packet management request, and generate a packet management response according to a management result, where the packet management response includes a management indication and the queue identifier.

Step 303: Send the packet management response to the processor or the switching fabric chip such that the processor or the switching fabric chip processes, according to the management indication, a data packet in a flow queue corresponding to the queue identifier.

Furthermore, the TM implementation apparatus receives the packet management request from the processor or the switching fabric chip, and then performs TM on the packet management request.

The queue identifier is used to identify a flow queue in which the processor or the switching fabric chip stores the data packet.

In this embodiment of the present disclosure, the TM implementation apparatus is located aside the processor or the switching fabric chip. The processor or the switching fabric chip parses a data packet to acquire a flow identifier and performs traffic classification, and then stores the data packet into a flow queue of the processor or the switching fabric chip, where the flow queue is identified using the queue identifier, and the queue identifier is one-to-one corresponding to the flow identifier. The TM implementation apparatus performs TM on a packet management request, and returns, to the processor or the switching fabric chip, a result of performing TM on the packet management request such that the processor or the switching fabric chip processes a data packet in a corresponding flow queue according to the result, thereby implementing a TM function of a network device by means of interworking between the TM implementation apparatus and the processor or the switching fabric chip. The TM implementation apparatus does not need to store a data packet, which reduces a quantity of external storage units of the device. In addition, because related information of the data packet (the packet management request/response) is exchanged between the TM implementation apparatus and the processor or the switching fabric chip, a communications interface between the TM implementation apparatus and the processor or the switching fabric chip is not limited by a high-speed data interface of a data path (communication between the switching fabric chip and the processor) such that an interface of the TM implementation apparatus is decoupled from the high-speed data interface of the data path.

After receiving the packet management request sent by the processor or the switching fabric chip, the TM implementation apparatus first determines, according to a congestion management policy of the TM implementation apparatus and a buffer status of a scheduling queue of the TM implementation apparatus, whether to discard the packet management request or store the packet management request into the scheduling queue.

The scheduling queue of the TM implementation apparatus is used to store the packet management request. Multiple scheduling queues may exist on the TM implementation apparatus at the same time and are used to store packet management requests corresponding to different flow queues. In this embodiment of the present disclosure, the scheduling queue is preferably identified using the queue identifier. Certainly, the scheduling queue may be identified using another identifier that is one-to-one corresponding to the queue identifier, which is not limited in the present disclosure.

Performing TM on the packet management request, and generating a packet management response according to a management result includes determining, according to the congestion management policy and the buffer status of the scheduling queue, whether to discard the packet management request, and discarding the packet management request and generating the packet management response if it is determined to discard the packet management request, where the management indication is a discard processing indication such that the processor or the switching fabric chip discards the data packet in the flow queue corresponding to the queue identifier, or storing the packet management request into the scheduling queue if it is determined not to discard the packet management request.

Further, if the determining result is no, the TM implementation apparatus stores the packet management request into the scheduling queue corresponding to the queue ID such that the TM implementation apparatus performs management and scheduling according to a queue scheduling policy. If the determining result is yes, the TM implementation apparatus does not buffer the packet management request, but directly discards the packet management request, and sends the packet management response in which the management indication is the discard processing indication to the processor or the switching fabric chip such that the processor or the switching fabric chip discards the data packet in the flow queue corresponding to the queue identifier.

The TM implementation apparatus further needs to perform management and scheduling on each scheduling queue according to the queue scheduling policy of the TM implementation apparatus in order to implement the TM function.

The performing TM on the packet management request, and generating a packet management response according to a management result further includes performing dequeue scheduling on the scheduling queue according to the queue scheduling policy, and generating the packet management response when the packet management request is dequeued from the scheduling queue, where the management indication is a forward processing indication such that the processor or the switching fabric chip forwards the data packet in the flow queue corresponding to the queue identifier.

Because a length of the packet management request is much shorter than a length of the data packet, the TM implementation apparatus needs only one external storage unit, such as a QDR SDRAM, to store the scheduling queue, and the external storage unit does not need to have an extremely large capacity. In addition, because the length of the packet management request is generally fixed, the scheduling queue may be implemented in a manner of a linked list.

The congestion management policy of the TM implementation apparatus includes a policy, such as congestion tail drop or congestion random drop.

When the congestion management policy of the TM implementation apparatus is the congestion tail drop, the determining, according to the congestion management policy and the buffer status of the scheduling queue corresponding to the queue identifier, whether to discard the packet management request includes determining, according to the congestion management policy, to discard the packet management request if a buffer of the scheduling queue corresponding to the queue identifier is full, or determining not to discard the packet management request if a buffer of the scheduling queue corresponding to the queue identifier is not full.

When the congestion management policy is the congestion random drop, that the TM implementation apparatus determines, according to the congestion management policy and the buffer status of the scheduling queue corresponding to the queue identifier, whether to discard the packet management request includes acquiring, from the scheduling queue according to the congestion management policy, a packet that is ready to be randomly discarded if a buffer of the scheduling queue corresponding to the queue identifier is full, and determining to discard the packet management request if the packet that is ready to be randomly discarded includes the packet management request, or determining not to discard the packet management request if the packet that is ready to be randomly discarded does not include the packet management request, or determining not to discard the packet management request if a buffer of the scheduling queue corresponding to the queue identifier is not full.

Further, the packet management request may further include a packet length, and the packet management response further includes the packet length such that the processor or the switching fabric chip can correctly acquire, according to the packet length, the data packet from the flow queue corresponding to the queue ID.

The queue scheduling policy of the TM implementation apparatus may be performing scheduling by byte, or may be performing scheduling by data packet.

When the queue scheduling policy is performing scheduling by byte, the packet management request further includes a packet length, and the performing dequeue scheduling on the scheduling queue according to the queue scheduling policy includes performing dequeue scheduling on the scheduling queue according to the queue scheduling policy and the packet length.

Furthermore, whether a packet length of a data packet needs to be exchanged between the TM implementation apparatus and the processor or the switching fabric chip needs to be determined according to the queue scheduling policy of the TM implementation apparatus and processing performed when the processor or the switching fabric chip performs traffic classification on the data packet.

When the queue scheduling policy of the TM implementation apparatus is performing scheduling by data packet, the TM implementation apparatus does not need to perform queue scheduling according to a packet length, and whether a packet length of a data packet needs to be exchanged between the TM implementation apparatus and the processor or the switching fabric chip is determined according to an implementation manner of the processor or the switching fabric chip.

Three possible implementation manners of the processor or the switching fabric chip are as follows.

In one possible implementation manner, after storing the data packet into the flow queue corresponding to the queue identifier, the processor or the switching fabric chip saves a head pointer and a tail pointer of the data packet in the flow queue such that the data packet can be correctly acquired from the flow queue according to the head pointer and the tail pointer.

If the queue scheduling policy of the TM implementation apparatus is performing scheduling by byte, the processor or the switching fabric chip further needs to acquire a packet length of the data packet, where the packet management request includes the packet length, and performing management and dequeue scheduling on the scheduling queue according to the queue scheduling policy includes performing dequeue scheduling on the scheduling queue according to the queue scheduling policy and the packet length.

In another possible implementation manner, after storing the data packet into the flow queue corresponding to the queue identifier, the processor or the switching fabric chip saves a head pointer of the data packet in the flow queue and a packet length of the data packet in order to determine the data packet in the flow queue such that the data packet can be correctly acquired from the flow queue according to the head pointer and the packet length, and the processor or the switching fabric chip needs to acquire the packet length of the data packet.

If the queue scheduling policy of the TM implementation apparatus is performing scheduling by byte, the packet management request further includes the packet length, and performing dequeue scheduling on the scheduling queue according to the queue scheduling policy includes performing dequeue scheduling on the scheduling queue according to the queue scheduling policy and the packet length.

In still another possible implementation manner, after storing the data packet into the flow queue corresponding to the queue identifier, the processor or the switching fabric chip saves only a head pointer of the data packet in the flow queue, and the processor or the switching fabric chip further acquires a packet length of the data packet, and exchanges the packet length of the data packet with the TM implementation apparatus.

Regardless of whether the queue scheduling policy of the TM implementation apparatus is performing scheduling by byte or performing scheduling by data packet, the packet management request further includes the packet length, and the packet management response also needs to include the packet length such that the processor or the switching fabric chip can correctly acquire, according to the packet length, the data packet in the flow queue corresponding to the queue identifier.

Further, the data packet received by the processor or the switching fabric chip may be a fragmented packet. That is, one data packet is divided into several fragmented packets.

The processor or the switching fabric chip may reassemble several fragmented packets into one complete data packet. Then as described above, perform parsing and traffic classification on the data packet, that is, acquire a flow identifier, acquire a queue identifier of a corresponding flow queue according to the flow identifier, and store the data packet into the flow queue.

Alternatively, the processor or the switching fabric chip may also send a fragment management request corresponding to the fragmented packet to the TM implementation apparatus, where the fragment management request includes fragment information and the foregoing queue identifier, and optionally, further includes a packet length of the fragmented packet. The TM implementation apparatus further includes a fragment linked list that is used to store several fragment management requests corresponding to one data packet, and the TM implementation apparatus uses the fragment linked list that stores the several fragment management requests corresponding to the one data packet as a whole to perform the foregoing TM, that is, to perform congestion control, store the data packet into a scheduling queue, and dequeue the data packet from the scheduling queue, and the like.

A packet management request/response transmitted between the TM implementation apparatus and the processor or the switching fabric chip may also encounter a packet loss. Therefore, the packet management request may further include a first serial number, and the packet management response may further include a second serial number in order to identify whether the packet management request/response transmitted between the TM implementation apparatus and the processor or the switching fabric chip encounters a packet loss.

Furthermore, the processor or the switching fabric chip generates a packet management request in ascending or descending order of serial numbers, and buffers the packet management request within a first preset retransmission time, and after receiving the packet management request, the TM implementation apparatus checks whether a serial number of the packet management request increases progressively or decreases progressively compared with a serial number of a previously received packet management request, for example, increases progressively by 1 or decreases progressively by 1. If the serial number of the packet management request increases progressively or decreases progressively compared with the serial number of the previously received packet management request, it is determined that no packet loss occurs. If the serial number of the packet management request does not increase progressively or decrease progressively compared with the serial number of the previously received packet management request, it is determined that a packet loss occurs, and the TM implementation apparatus requests the processor or the switching fabric chip to retransmit a packet management request whose serial number is between the serial number of the packet management request and the serial number of the previously received packet management request. Furthermore, the TM implementation apparatus sends a first packet retransmission request to the processor or the switching fabric chip, where the first packet retransmission request includes the first serial number. The processor or the switching fabric chip receives the first packet retransmission request and retransmits the packet management request corresponding to the first serial number.

Likewise, the TM implementation apparatus generates a packet management response in ascending or descending order of serial numbers, and buffers the packet management response within a second preset retransmission time, and after receiving the packet management response, the processor or the switching fabric chip checks whether a serial number of the packet management response increases progressively or decreases progressively compared with a serial number of a previously received packet management response, for example, increases progressively by 1 or decreases progressively by 1. If the serial number of the packet management response increases progressively or decreases progressively compared with the serial number of the previously received packet management response, it is determined that no packet loss occurs. If the serial number of the packet management response does not increase progressively or decrease progressively compared with the serial number of the previously received packet management response, it is determined that a packet loss occurs, and the processor or the switching fabric chip requests the TM implementation apparatus to retransmit a packet management response whose serial number is between the serial number of the packet management response and the serial number of the previously received packet management response. Furthermore, the processor or the switching fabric chip sends a second packet retransmission request to the TM implementation apparatus, where the second packet retransmission request includes the second serial number. The TM implementation apparatus receives the second packet retransmission request and retransmits the packet management response corresponding to the second serial number.

Further, the switching fabric chip may further perform reverse flow control, that is, reversely control forwarding of a flow queue. The processor or the switching fabric chip sends a flow control request to the TM implementation apparatus, where the flow control request includes a queue identifier and a traffic control requirement such that the TM implementation apparatus can perform, according to the traffic control requirement, enqueue and dequeue scheduling on a scheduling queue corresponding to the queue identifier.

According to the TM implementation method provided in this embodiment of the present disclosure, a TM implementation apparatus is located aside a processor or a switching fabric chip, and interworks with the processor or the switching fabric chip in order to implement a TM function of a network device. Because parsing and traffic classification are performed on a data packet on the processor or the switching fabric chip, the TM implementation apparatus acquires related information of the data packet by communicating with the processor or the switching fabric chip in order to perform TM. In this way, the TM implementation apparatus does not need to use a high-specification FPGA, and a middle and low level FPGA chip can meet requirements of the TM function, logical processing, and performance, which reduces a cost of the network device. In addition, the TM implementation apparatus does not need to store the data packet, which reduces a quantity of external storage units of the device, and can further reduce the cost of the network device. Furthermore, because a communications interface between the TM implementation apparatus and the processor or the switching fabric chip is not limited by a high-speed data interface of a data path (used for communication between the switching fabric chip and the processor), interface implementation is flexible, which can also reduce implementation complexity and difficulty of the network device.

Figure 4:
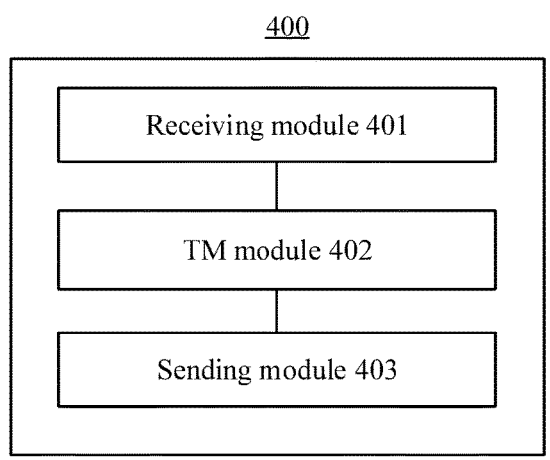
FIG. 4 is a schematic diagram of a TM implementation apparatus according to an embodiment of the present disclosure.

Referring to FIG. 4, an embodiment of the present disclosure provides a TM implementation apparatus, where the TM implementation apparatus 400 includes a receiving module 401 configured to receive a packet management request sent by a processor or a switching fabric chip, where the packet management request includes a queue identifier, and the queue identifier is used to identify a flow queue in which the processor or the switching fabric chip stores a data packet, a TM module 402 configured to perform TM on the packet management request, and generate a packet management response according to a management result, where the packet management response includes a management indication and the queue identifier, and a sending module 403 configured to send the packet management response to the processor or the switching fabric chip such that the processor or the switching fabric chip processes, according to the management indication, the data packet in the flow queue corresponding to the queue identifier.

The TM module 402 is further configured to determine, according to a congestion management policy of the TM implementation apparatus 400 and a buffer status of a scheduling queue of the TM implementation apparatus 400, whether to discard the packet management request, and store the packet management request into the scheduling queue if it is determined not to discard the packet management request, or discard the packet management request and generate the packet management response if it is determined to discard the packet management request, where the management indication is a discard processing indication such that the processor or the switching fabric chip discards the data packet in the flow queue corresponding to the queue identifier.

The scheduling queue is used to store the packet management request.

The TM module 402 is further configured to perform dequeue scheduling on the scheduling queue according to a queue scheduling policy of the TM implementation apparatus 400, and generate the packet management response, where the management indication is a forward processing indication such that the processor or the switching fabric chip forwards the data packet in the flow queue corresponding to the queue identifier when the packet management request is dequeued from the scheduling queue.

Optionally, the TM module 402 includes a congestion control submodule (not shown) configured to determine, according to the congestion management policy and the buffer status of the scheduling queue, whether to discard the packet management request, a queue management submodule (not shown) configured to store the packet management request into the scheduling queue when a determining result of the congestion control submodule is no, and further configured to perform dequeue scheduling on the scheduling queue according to the queue scheduling policy, and generate the packet management response when the packet management request is dequeued from the scheduling queue, where the management indication is the forward processing indication such that the processor or the switching fabric chip forwards the data packet in the flow queue corresponding to the queue identifier, and a discard submodule (not shown) configured to discard the packet management request and generate the packet management response when determining result of the congestion control submodule is yes, where the management indication is the discard processing indication such that the processor or the switching fabric chip discards the data packet in the flow queue corresponding to the queue identifier.

The congestion management policy includes a policy, such as congestion random drop or congestion tail drop.

When the congestion management policy is the congestion tail drop, the congestion control submodule is further configured to determine, according to the congestion management policy, to discard the packet management request if a buffer of the scheduling queue corresponding to the queue identifier is full, or determine not to discard the packet management request if a buffer of the scheduling queue corresponding to the queue identifier is not full.

When the congestion management policy is the congestion random drop, the congestion control submodule is further configured to acquire, according to the congestion management policy, a packet that is ready to be randomly discarded if a buffer of the scheduling queue corresponding to the queue identifier is full, and determine to discard the packet management request if the packet that is ready to be randomly discarded includes the packet management request, or determine not to discard the packet management request if the packet that is ready to be randomly discarded does not include the packet management request, or determine not to discard the packet management request if a buffer of the scheduling queue corresponding to the queue identifier is not full.

Further, the packet management request may further include a packet length, and the packet management response further includes the packet length such that the processor or the switching fabric chip can correctly acquire, according to the packet length, the data packet from the flow queue corresponding to the queue identifier.

The queue scheduling policy of the TM implementation apparatus 400 may be performing scheduling by byte, or may be performing scheduling by data packet.

When the queue scheduling policy is performing scheduling by byte, the packet management request further includes a packet length, and the queue management submodule is further configured to perform dequeue scheduling on the scheduling queue according to the queue scheduling policy and the packet length.

Furthermore, whether a packet length of a data packet needs to be exchanged between the TM implementation apparatus 400 and the processor or the switching fabric chip needs to be determined according to the queue scheduling policy of the TM implementation apparatus 400 and processing performed when the processor or the switching fabric chip performs traffic classification on the data packet.

When the queue scheduling policy of the TM implementation apparatus is performing scheduling by data packet, the TM implementation apparatus does not need to perform queue scheduling according to a packet length, and whether a packet length of a data packet needs to be exchanged between the TM implementation apparatus and the processor or the switching fabric chip is determined according to an implementation manner of the processor or the switching fabric chip.

Three possible implementation manners of the processor or the switching fabric chip are as follows.

In one possible implementation manner, after storing the data packet into the flow queue corresponding to the queue identifier, the processor or the switching fabric chip may save a head pointer and a tail pointer of the data packet in the flow queue such that the data packet can be correctly acquired from the flow queue according to the head pointer and the tail pointer.

If the queue scheduling policy is performing scheduling by byte, the processor or the switching fabric chip further needs to acquire a packet length of the data packet, where the packet management request includes the packet length, and the queue management submodule is further configured to perform dequeue scheduling on the scheduling queue according to the queue scheduling policy and the packet length.

In another possible implementation manner, after storing the data packet into the flow queue corresponding to the queue identifier, the processor or the switching fabric chip saves a head pointer of the data packet in the flow queue and a packet length of the data packet in order to determine the data packet in the flow queue such that the data packet can be correctly acquired from the flow queue according to the head pointer and the packet length, and the processor or the switching fabric chip further needs to acquire the packet length of the data packet.

If the queue scheduling policy is performing scheduling by byte, the packet management request further includes the packet length, and the queue management submodule is further configured to perform dequeue scheduling on the scheduling queue according to the queue scheduling policy and the packet length.

In still another possible implementation manner, after storing the data packet into the flow queue corresponding to the queue identifier, the processor or the switching fabric chip saves only a head pointer of the data packet in the flow queue, and the processor or the switching fabric chip further acquires a packet length of the data packet, and exchanges the packet length of the data packet with the TM implementation apparatus 400.

The packet management request further includes the packet length, and the packet management response also needs to include the packet length such that the processor or the switching fabric chip can correctly acquire, according to the packet length, the data packet from the flow queue corresponding to the queue identifier.

Further, the data packet received by the processor or the switching fabric chip may be a fragmented packet. That is, one data packet is divided into several fragmented packets.

The processor or the switching fabric chip may be further configured to reassemble several fragmented packets into one complete data packet. Then as described above, perform parsing and traffic classification on the data packet, that is, acquire a flow identifier, acquire a queue identifier of a corresponding flow queue according to the flow identifier, and store the data packet into the flow queue.

Alternatively, the processor or the switching fabric chip may send a fragment management request corresponding to the fragmented packet to the TM implementation apparatus, where the fragment management request includes fragment information and the foregoing queue identifier, and optionally, further includes a packet length of the fragmented packet. The TM implementation apparatus further includes a fragment linked list that is used to store several fragment management requests corresponding to one data packet, and the TM implementation apparatus further uses the fragment linked list that stores the several fragment management requests corresponding to the one data packet as a whole to perform the foregoing TM, that is, to perform congestion control, store the data packet into a scheduling queue, and dequeue the data packet from the scheduling queue, and the like.

A packet management request/response transmitted between the TM implementation apparatus and the processor or the switching fabric chip may also encounter a packet loss. Therefore, the packet management request may further include a first serial number, and the packet management response may further include a second serial number in order to identify whether the packet management request/response transmitted between the TM implementation apparatus and the processor or the switching fabric chip encounters a packet loss.

Furthermore, the processor or the switching fabric chip generates a packet management request in ascending or descending order of serial numbers, and buffers the packet management request within a first preset retransmission time, and after receiving the packet management request, the TM implementation apparatus checks whether a serial number of the packet management request increases progressively or decreases progressively compared with a serial number of a previously received packet management request, for example, increases progressively by 1 or decreases progressively by 1. If the serial number of the packet management request increases progressively or decreases progressively compared with the serial number of the previously received packet management request, it is determined that no packet loss occurs. If the serial number of the packet management request does not increase progressively or decrease progressively compared with the serial number of the previously received packet management request, it is determined that a packet loss occurs, and the TM implementation apparatus requests the processor or the switching fabric chip to retransmit a packet management request whose serial number is between the serial number of the packet management request and the serial number of the previously received packet management request.

The TM implementation apparatus is further configured to send a first packet retransmission request, where the first packet retransmission request includes the first serial number. The processor or the switching fabric chip is further configured to receive the first packet retransmission request and retransmit the packet management request corresponding to the first serial number.

Likewise, the TM implementation apparatus generates a packet management response in ascending or descending order of serial numbers, and buffers the packet management response within a second preset retransmission time, and after receiving the packet management response, the processor or the switching fabric chip checks whether a serial number of the packet management response increases progressively or decreases progressively compared with a serial number of a previously received packet management response, for example, increases progressively by 1 or decreases progressively by 1. If the serial number of the packet management response increases progressively or decreases progressively compared with the serial number of the previously received packet management response, it is determined that no packet loss occurs. If the serial number of the packet management response does not increase progressively or decrease progressively compared with the serial number of the previously received packet management response, it is determined that a packet loss occurs, and the processor or the switching fabric chip requests the TM implementation apparatus to retransmit a packet management response whose serial number is between the serial number of the packet management response and the serial number of the previously received packet management response.

The processor or the switching fabric chip is further configured to send a second packet retransmission request, where the second packet retransmission request includes the second serial number. The TM implementation apparatus is further configured to receive the second packet retransmission request and retransmit the packet management response corresponding to the second serial number.

The switching fabric chip may further perform reverse flow control, that is, reversely control forwarding of a flow queue. The processor or the switching fabric chip is further configured to send a flow control request to the TM implementation apparatus, where the flow control request includes a queue identifier and a traffic control requirement such that the TM implementation apparatus can perform, according to the traffic control requirement, enqueue and dequeue scheduling on a scheduling queue corresponding to the queue identifier.

The TM implementation apparatus 400 provided in this embodiment of the present disclosure is located aside a processor or a switching fabric chip, and interacts and interworks with the processor or the switching fabric chip in order to implement a TM function of a network device. The TM implementation apparatus 400 does not need to use a high-specification FPGA, and a middle and low level FPGA chip can meet requirements of the TM function, logical processing, and performance, which reduces a cost of the network device. In addition, being different from a TM chip, in the prior art, that needs to be equipped with a dedicated external storage unit to store a data packet, the TM implementation apparatus 400 in this embodiment of the present disclosure does not need to store a data packet, which reduces a quantity of external storage units of the device, and can further reduce the cost of the network device. Furthermore, because communication between the TM implementation apparatus 400 and the processor or the switching fabric chip is not limited by a data path (used for communication between the switching fabric chip and the processor), interface implementation is flexible, which can also reduce implementation complexity and difficulty of the network device.

A person of ordinary skill in the art may understand that all or a part of the steps of the methods in the foregoing embodiments may be implemented by a program instructing relevant hardware. The corresponding program may be stored in a computer readable storage medium. The foregoing storage medium may include a RAM, a read-only memory, a flash memory, a hard disk, a solid state disk, or an optical disc.

The foregoing descriptions are merely exemplary implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A traffic management implementation method, comprising:
   receiving a packet management request from a processor or a switching fabric chip, the packet management request comprising a queue identifier that identifies a flow queue in which a data packet is stored;
   determining, according to a congestion management policy and a buffer status of a scheduling queue, whether to discard the packet management request, the scheduling queue being used to store the packet management request;
   discarding the packet management request when the packet management request is to be discarded;

generating a packet management response comprising a management indication and the queue identifier, the management indication being a discard processing indication;
storing the packet management request into the scheduling queue when the packet management request is not to be discarded; and
sending the packet management response to the processor or the switching fabric chip.

2. The method of claim 1, further comprising:
performing dequeue scheduling on the scheduling queue according to a queue scheduling policy; and
generating the packet management response when the packet management request is dequeued from the scheduling queue,
wherein the management indication is a forward processing indication.

3. The method of claim 2, the queue scheduling policy is performing scheduling by byte, the packet management request further comprises a packet length, and performing dequeue scheduling on the scheduling queue according to the queue scheduling policy comprises performing dequeue scheduling on the scheduling queue according to the queue scheduling policy and the packet length.

4. The method of claim 1, wherein the congestion management policy is congestion tail drop, and determining, according to the congestion management policy and the buffer status of the scheduling queue, whether to discard the packet management request comprises:
determining, according to the congestion management policy, that the packet management request is to be discarded when a buffer of the scheduling queue is full; and
determining that the packet management request is not to be discarded when the buffer of the scheduling queue is not full.

5. The method of claim 1, wherein the congestion management policy is congestion random drop, and determining, according to the congestion management policy and the buffer status of the scheduling queue, whether to discard the packet management request comprises:
acquiring, from the scheduling queue according to the congestion management policy, a packet that is ready to be randomly discarded when a buffer of the scheduling queue is full;
determining that the packet management request is to be discarded when the packet that is ready to be randomly discarded comprises the packet management request;
determining that the packet management request is not to be discarded when the packet that is ready to be randomly discarded does not comprise the packet management request; and
determining that the packet management request is not to be discarded when the buffer of the scheduling queue is not full.

6. A traffic management implementation method, comprising:
receiving a packet management request from a processor or a switching fabric chip, the packet management request comprising a packet length and a queue identifier that identifies a flow queue in which a data packet is stored;
performing traffic management on the packet management request;
generating a packet management response according to a management result, the packet management response comprising the packet length, a management indication and the queue identifier; and
sending the packet management response to the processor or the switching fabric chip.

7. A network device, comprising:
a traffic management (TM) implementation apparatus;
a switching fabric chip; and
a processor coupled to the TM implementation apparatus and the switching fabric chip, the processor comprising a first interface and a second interface, and the processor being configured to:
communicate with the TM implementation apparatus through the first interface;
communicate with the switching fabric chip through the second interface;
receive a data packet from the switching fabric chip via the second interface;
parse the data packet to acquire a flow identifier;
acquire a queue identifier of a flow queue according to the flow identifier;
store the data packet into the flow queue; and
send a packet management request to the TM implementation apparatus through the first interface, the packet management request comprising the queue identifier,
wherein the TM implementation apparatus is configured to:
receive the packet management request;
determine, according to a congestion management policy of the TM implementation apparatus and a buffer status of a scheduling queue of the TM implementation apparatus, whether to discard the packet management request, the scheduling queue being used to store the packet management request;
discard the packet management request when the packet management request is to be discarded;
generate a packet management response comprising a management indication and the queue identifier, the management indication being a discard processing indication;
store the packet management request into the scheduling queue when the packet management request is not to be discarded; and
send the packet management response to the processor, and
wherein the processor is further configured to:
discard, according to the discard processing indication, the data packet in the flow queue corresponding to the queue identifier;
receive the packet management response through the first interface; and
process, according to the management indication, the data packet in the flow queue corresponding to the queue identifier.

8. The network device of claim 7, wherein the TM implementation apparatus is further configured to:
perform dequeue scheduling on the scheduling queue according to a queue scheduling policy of the TM implementation apparatus;
generate the packet management response when the packet management request is dequeued from the scheduling queue, the management indication being a forward processing indication, and
wherein the processor is further configured to forward, according to the forward processing indication, the data packet in the flow queue corresponding to the queue identifier.

9. The network device of claim 8, wherein the queue scheduling policy is performing scheduling by byte, the packet management request further comprises a packet length, the TM implementation apparatus is further configured to perform dequeue scheduling on the scheduling queue according to the queue scheduling policy and the packet length, and the processor is further configured to acquire, according to the packet length, the data packet from the low queue corresponding to the queue identifier.

10. The network device of claim 7, wherein the congestion management policy is congestion tail drop, and the TM implementation apparatus is further configured to:
determine, according to the congestion management policy, that the packet management request is to be discarded when a buffer of the scheduling queue corresponding to the queue identifier is full; and
determine that the packet management request is not to be discarded when the buffer of the scheduling queue corresponding to the queue identifier is not full.

11. The network device of claim 7, wherein the congestion management policy is congestion random drop, and the TM implementation apparatus is further configured to:
acquire, according to the congestion management policy, a packet that is ready to be randomly discarded when a buffer of the scheduling queue corresponding to the queue identifier is full;
determine that the packet management request is to be discarded when the packet that is ready to be randomly discarded comprises the packet management request;
determine that the packet management request is not to be discarded when the packet that is ready to be randomly discarded does not comprise the packet management request; and
determine that the packet management request is not to be discarded when the buffer of the scheduling queue corresponding to the queue identifier is not full.

12. A network device, comprising:
a traffic management (TM) implementation apparatus;
a switching fabric chip; and
a processor coupled to the TM implementation apparatus and the switching fabric chip, the processor comprising a first interface and a second interface, and the processor being configured to:
communicate with the TM implementation apparatus through the first interface;
communicate with the switching fabric chip through the second interface;
receive a data packet from the switching fabric chip via the second interface;
parse the data packet to acquire a flow identifier;
acquire a queue identifier of a flow queue according to the flow identifier;
store the data packet into the flow queue; and
send a packet management request to the TM implementation apparatus through the first interface, the packet management request comprising the queue identifier and a packet length,
wherein the TM implementation apparatus is configured to:
receive the packet management request;
perform traffic management on the packet management request;
generate a packet management response according to a management result, the packet management response comprising the packet length a management indication, and the queue identifier; and
send the packet management response to the processor, and
wherein the processor is further configured to:
receive the packet management response through the first interface;
acquire, according to the packet length, the data packet from the flow queue corresponding to the queue identifier; and
process, according to the management indication, the data packet in the flow queue corresponding to the queue identifier.

13. A network device, comprising:
a traffic management (TM) implementation apparatus; and
a switching fabric chip comprising a first interface and configured to:
communicate with the TM implementation apparatus through the first interface,
parse a data packet to acquire a flow identifier;
acquire a queue identifier of a flow queue according to the flow identifier;
store the data packet into the flow queue; and
send a packet management request to the TM implementation apparatus through the first interface, the packet management request comprising the queue identifier,
wherein the TM implementation apparatus is configured to:
receive the packet management request;
determine, according to a congestion management policy of the TM implementation apparatus and a buffer status of a scheduling queue of the TM implementation apparatus, whether to discard the packet management request, the scheduling queue being used to store the packet management request;
discard the packet management request when the packet management request is to be discarded;
generate a packet management response comprising a management indication and the queue identifier, the management indication being a discard processing indication;
store the packet management request into the scheduling queue when the packet management request is not to be discarded; and
send the packet management response to the switching fabric chip, and
wherein the switching fabric chip is further configured to:
discard, according to the discard processing indication, the data packet in the flow queue corresponding to the queue identifier;
receive the packet management response through the first interface; and
process, according to the management indication, the data packet in the flow queue corresponding to the queue identifier in order to implement traffic management of the network device.

14. The network device of claim 13, wherein he TM implementation apparatus is further configured to:
perform dequeue scheduling on the scheduling queue according to a queue scheduling policy of the TM implementation apparatus; and
generate the packet management response when the packet management request is dequeued from the scheduling queue, the management indication being a forward processing indication such that the switching fabric chip forwards the data packet in the flow queue corresponding to the queue identifier, and wherein the switching fabric chip is further configured to forward, according to the forward processing indication, the data packet in the flow queue corresponding to the queue identifier.

15. The network device of claim 14, wherein the queue scheduling policy is performing scheduling by byte, the packet management request further comprises a packet length, the TM implementation apparatus is further configured to perform dequeue scheduling on the scheduling queue according to the queue scheduling policy and the packet length, and the switching fabric chip is further configured to acquire, according to the packet length, the data packet from the flow queue corresponding to the queue identifier.

16. The network device of claim 13, wherein the congestion management policy is congestion tail drop, and the TM implementation apparatus is further configured to:
  determine, according to the congestion management policy, that the packet management request is to be discarded when a buffer of the scheduling queue corresponding to the queue identifier is full; and
  determine that the packet management request is not to be discarded when the buffer of the scheduling queue corresponding to the queue identifier is not full.

17. The network device of claim 13, wherein the congestion management policy is congestion random drop, and the TM implementation apparatus is further configured to:
  acquire, according to the congestion management policy, a packet that is ready to be randomly discarded when a buffer of the scheduling queue corresponding to the queue identifier is full;
  determine that the packet management request is to the discarded when the packet that is ready to be randomly discarded comprises the packet management request;
  determine that the packet management request is not to be discarded when the packet that is ready to be randomly discarded does not comprise the packet management request; and
  determine that the packet management request is not to be discarded when the buffer of the scheduling queue corresponding to the queue identifier is not full.

* * * * *

UNITED STATES PATENT AND TRADEMARK OFFICE
CERTIFICATE OF CORRECTION

PATENT NO. : 10,129,151 B2  
APPLICATION NO. : 15/258439  
DATED : November 13, 2018  
INVENTOR(S) : Weibo Xiong et al.

Page 1 of 1

It is certified that error appears in the above-identified patent and that said Letters Patent is hereby corrected as shown below:

On the Title Page

Item (30), Line 1: "201410451900" should read "201410451900.8"

In the Claims

Column 31, Line 18: insert --wherein-- after "claim 2,"

Column 33, Line 8: "low" should read "flow"

Column 34, Line 57: "he" should read "the"

Column 36, Line 11: "the" should read "be"

Signed and Sealed this  
Twenty-fifth Day of December, 2018

Andrei Iancu  
*Director of the United States Patent and Trademark Office*